Dec. 13, 1955   L. S. RADKOWSKI ET AL   2,726,550
GYRO CAGING MECHANISM

Filed Sept. 21, 1954   3 Sheets-Sheet 1

INVENTORS
LEO S. RADKOWSKI
RONALD G. WARREN
THOMAS A. DALY
HARRY E. ELLERMAN, JR.
BY
G. D. O'Brien

ATTORNEYS

Dec. 13, 1955 L. S. RADKOWSKI ET AL 2,726,550
GYRO CAGING MECHANISM
Filed Sept. 21, 1954 3 Sheets-Sheet 2

INVENTORS
LEO S. RADKOWSKI
RONALD G. WARREN
THOMAS A. DALY
HARRY E. ELLERMAN, JR.
BY
G. D. O'Brien

ATTORNEYS

Dec. 13, 1955   L. S. RADKOWSKI ET AL   2,726,550
GYRO CAGING MECHANISM

Filed Sept. 21, 1954   3 Sheets-Sheet 3

INVENTORS
LEO S. RADKOWSKI
RONALD G. WARREN
THOMAS A. DALY
HARRY E. ELLERMAN, JR.
BY
G. D. O'Brien

ATTORNEYS

_United States Patent Office_

2,726,550
Patented Dec. 13, 1955

2,726,550

GYRO CAGING MECHANISM

Leo S. Radkowski and Ronald G. Warren, Sharon, Thomas A. Daly, Wallingford, and Harry E. Ellerman, Jr., Sharon, Pa., assignors, by mesne assignments, to the United States of America as represented by the Secretary of the Navy Application September 21, 1954, Serial No. 457,576

1 Claim. (Cl. 74—5.1)

The present invention relates to gyroscopic apparatus and more particularly to an electrically actuated caging mechanism for two-degrees-of-freedom gyroscopes.

It is conventional in gyroscopic apparatus to provide mechanism for centralizing or positioning, that is caging, the gyro gimbal mountings relative to a fixed reference while the gyro rotor is stationary or is being brought up to its normal running speed. Various caging arrangements have been proposed for two-degrees-of-freedom gyroscopes, but such prior arrangements were excessively complex, costly, difficult to manufacture, and not completely reliable. Of primary importance in certain applications, however, is the speed with which caging and uncaging of the gyro can be accomplished. The prior caging arrangements generally employed a motor and gear train assembly for effecting caging. In order to keep the total size and mass of the gyro assembly within the restricted limits required in certain applications, wherein size and weight limitations are critical, it was necessary to employ relatively small size motors in such prior caging arrangements with the result that gear trains were required to raise the torque output of the caging system to the value required for the caging operation. The introduction of such gear trains into the system, however, substantially reduced the speed with which caging could be accomplished.

The present invention successfully avoids the disadvantages inherent in the prior gyro caging arrangements by employing a rotary solenoid which operates to move a pair of gimbal caging arms into engagement with a pair of cam members fixed to the gyro gimbals. Pressure of rollers, carried by the arms, on the cam surfaces causes the gimbals to swing to predetermined, or caged positions, wherein the rollers drop into slots formed in each of the cams whereby to maintain the gimbals in their caged positions. Owing to the substantially greater torque output of a rotary solenoid as compared with that of a motor of comparable size, reduction gearing for increasing torque is not required, and, therefore, caging and uncaging of the gyro may be effected much more rapidly than with prior caging systems.

In accordance with the foregoing, an object of the invention is the provision of an improved, rapid operating caging system for gyroscopes.

Another object of the invention is the provision of an improved caging system for two-degrees-of-freedom gyroscopes wherein the power for the caging and uncaging operations is supplied by a rotary solenoid whereby the necessary caging torque is produced without a reduction in the speed with which the caging and uncaging operations can be accomplished.

Still a further object of the invention is the provision of a two-degrees-of-freedom gyroscope assembly embodying an improved caging system as in the foregoing which is relatively small in size and mass and wherein caging and uncaging of the gyro may be rapidly accomplished.

Other objects and many of the attendant advantages of this invention will be readily appreciated as the same becomes better understood by reference to the following detailed description had in conjunction with the annexed drawings wherein.

Figure 1:
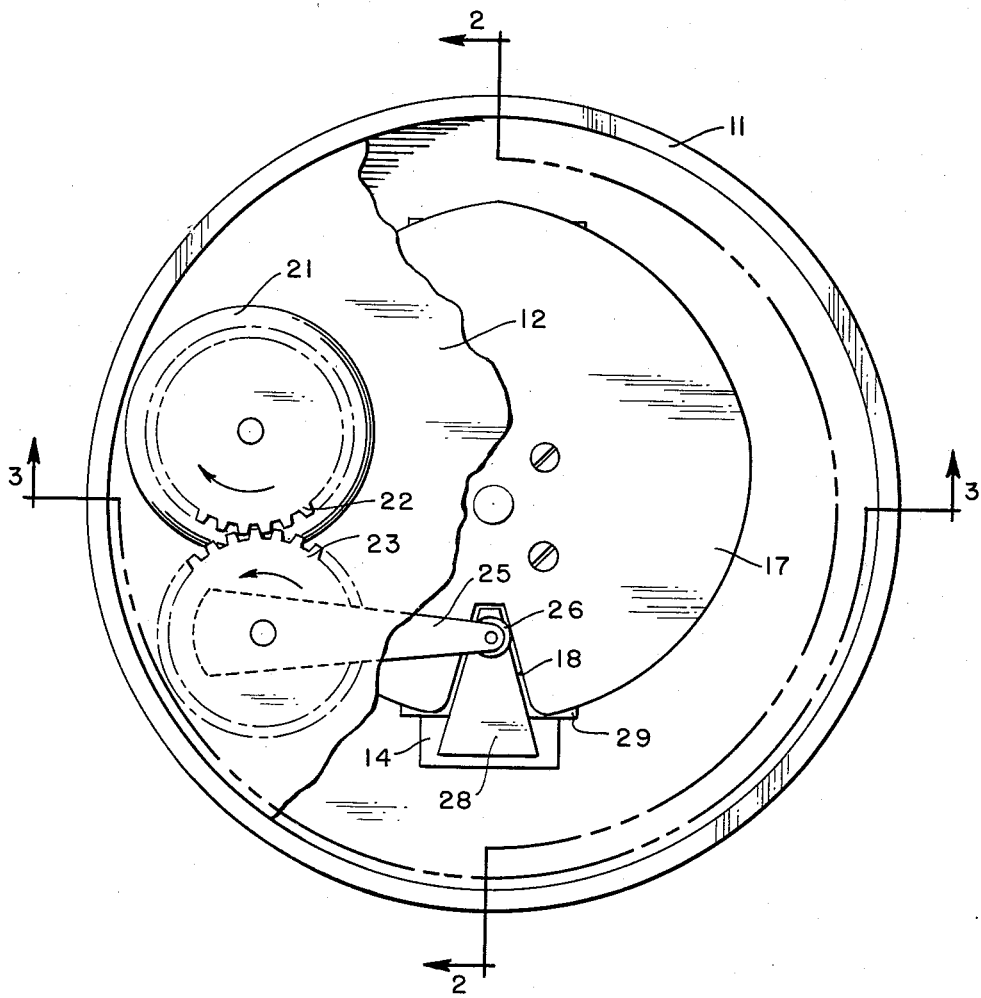
Fig. 1 is a plan view of a gyro assembly embodying the present caging mechanism, parts being broken away for the sake of clarity.
Figure 2:
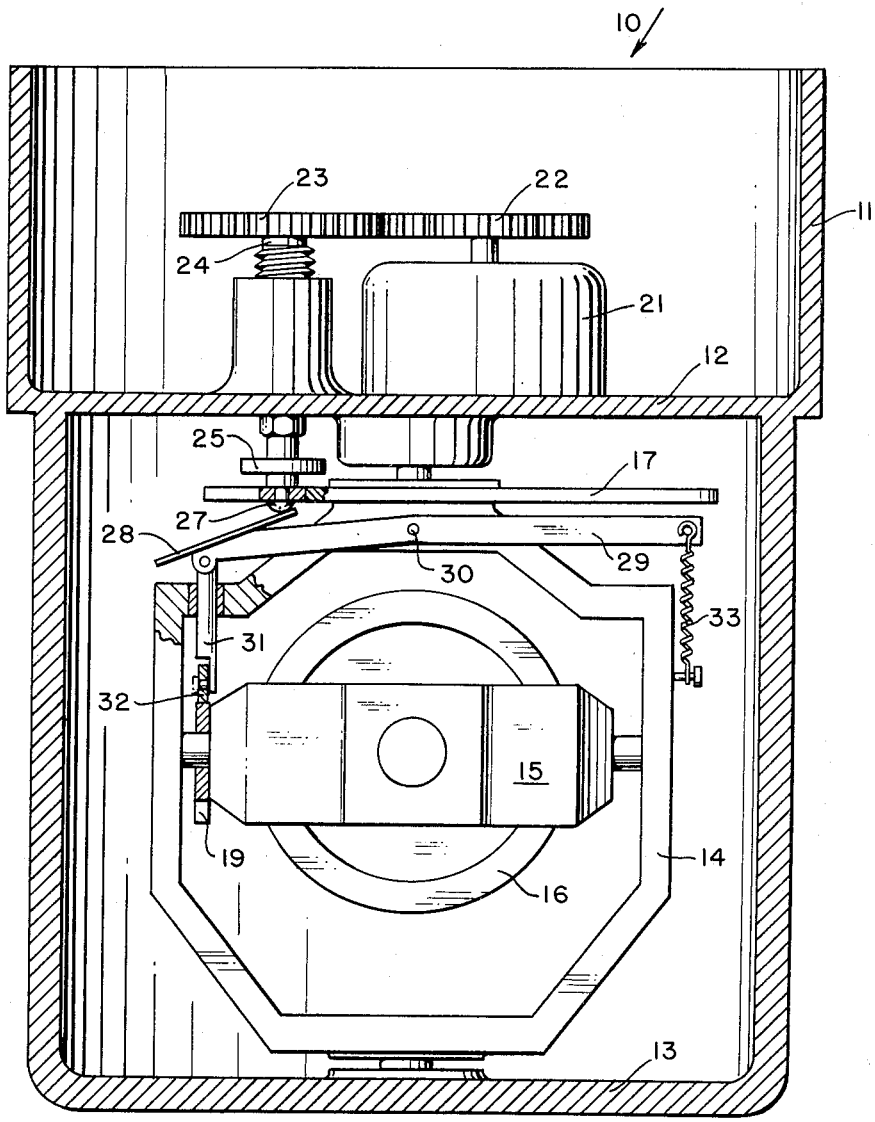
Fig. 2 is a longitudinal sectional view of the gyro assembly taken substantially along line 2—2 of Fig. 1, parts being broken away so as to more clearly illustrate certain features of the caging mechanism.
Figure 3:
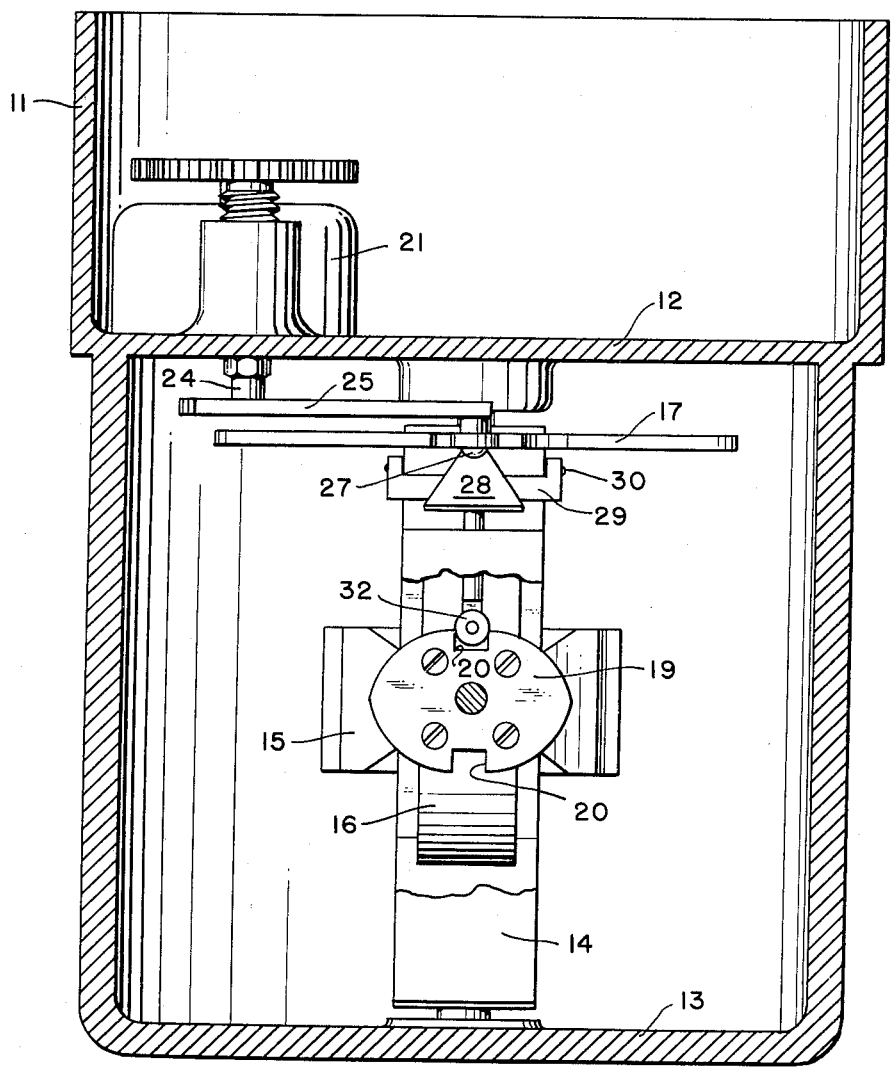
Fig. 3 is a longitudinal sectional view taken substantially along line 3—3 of Fig. 1 with certain of the parts broken away for the sake of clarity.

Referring now to the drawings and more particularly to Fig. 2 thereof, 10 denotes a gyroscope assembly, embodying the present caging mechanism, comprising a casing 11 including a pair of spaced wall portions 12 and 13. Pivotally journaled in wall portions 12 and 13, for movement about a first axis perpendicular to wall portions 12 and 13, is an outer gimbal mounting 14. Pivotally supported on outer gimbal 14, for movement about an axis perpendicular to the first mentioned axis, is an inner gimbal 15. A gyro rotor 16 is rotatably carried by the inner gimbal 15 for rotation about an axis perpendicular to the pivotal axis of the second gimbal 15. Gimbals 14 and 15 and rotor 16 form a conventional two-degrees-of-freedom gyroscope. Any suitable driving means, not shown, may be provided for driving rotor 16 to its normal running speed. The present caging assembly comprises a first, generally heart-shaped cam 17, more clearly illustrated in Fig. 1, fixed to the upper end of outer gimbal 14. Cam 17 has formed therein a substantially V-shaped slot 18, for a purpose later to be described. Fixed to one end of the inner gimbal 15 is a double heart-shaped cam 19 including a pair of notches 20. Mounted on the upper side of wall portion 12 is a rotary solenoid 21, the rotary shaft of which carries a first gear 22 which meshes with a second gear 23 fixed to a shaft 24. Shaft 24 is journaled in a raised boss formed on, and projects through wall portion 12. Shaft 24 fixedly carries, at its lower end, an arm 25, the latter supporting a roller 26 at its outer end. The periphery of roller 26 is adapted to ride on the cam surface of cam 17, and, in the caged position of the outer gimbal, to drop into slot 18, as will be described. The lower end of arm 25 is provided with a spherical surface 27 which is adapted to engage an inclined plate 28 secured to one end of a lever arm 29. Lever arm 29 has an opening formed therethrough intermediate its ends through which the upper end of the outer gimbal extends (see Fig. 3) and is pivoted substantially midway between its ends, as at 30, to the outer gimbal 14. Pivotally connected at its upper end to said one end of lever arm 29 and slidably guided in gimbal 14 is a shaft 31 carrying a roller 32 at its lower end, which roller is adapted to ride on the cam surface of cam 19 and to drop into either one of slots 20 in the caged position of the inner gimbal 15. Fixed at its ends to the other end of the lever arm 29 and to outer gimbal 14 is a spring 33 which serves to bias roller 32 out of the slot 20 and plate 28 toward spherical surface 27.

Operation of the present caging mechanism is as follows. The parts of the gyroscope assembly are shown in the positions they occupy in the caged condition of the gyro assembly, in which caged condition, current from a source, not shown, will be applied to the rotary solenoid 21 whereby the parts will be maintained in their caged positions. To effect uncaging of the gyro, the solenoid 21 is deenergized whereby to permit a biasing spring (not shown) within solenoid 21 to move arm 25 in a direction (clockwise as seen in Fig. 1) to retract roller 26 from slot 18, thereby uncaging the outer gimbal 14, and to move spherical surface 27 out of engagement with plate 28, permitting spring 33 to move lever arm 29 in a direction to retract roller 32 from slot 20, thereby uncaging the inner gimbal 15. When it is desired to recage the gyro, solenoid 21 is energized whereby to move arm 25 in a counter-clockwise direction, as seen in Fig. 1. Roller 26 on arm 25 will be urged against the cam surface of cam member 17, and owing to the shape of the cam member, a torque will be exerted on the latter causing it to rotate, together with the gyro gimbals, about the outer gimbal axis in a direction to bring slot 18 into registry with roller 26. When slot 18 and roller 26 become aligned, the roller will drop into the slot, caging the outer gimbal, the spherical surface 27 moving into contact with the inclined plate 28. Roller 32 will, thereby, be urged downwardly against the cam surface of cam member 19, and, owing to the shape of the cam member 19, a torque will be exerted on the latter tending to cause the cam member, along with the inner gimbal, to rotate about the axis of the latter to bring one of the slots 20 into registry with the roller 32. When one of the slots 20 becomes aligned with the roller 32, the latter will drop into the slot, caging the inner gimbal. With the gyro rotor 16 running at normal operating speed, caging of the gyro may be accomplished in less than 30 seconds while uncaging of the gyro may be accomplished in a fraction of a second.

Obviously, many modifications and variation of the present invention are possible in the light of the above teachings. It is therefore to be understood that within the scope of the appended claims the invention may be practiced otherwise than as specifically described.

What is claimed is:

In a gyro of the two degrees of freedom type having an outer gimbal rotatably supported by a frame adapted to be fixed to a vehicle and an inner gimbal rotatably supported by the outer gimbal, a rotor rotatably supported by the inner gimbal and caging means for caging the gimbals, the improvements in said caging means, comprising; a heart shaped cam affixed to the outer gimbal having a peripheral surface rotatable in a plane perpendicular to the axis of rotation of the outer gimbal, a first arm pivotally carried by the frame having a roller adapted to ride on said surface, means for applying a torque to the arm, a double heart shaped cam affixed to the inner gimbal having a peripheral surface rotatable in a plane perpendicular to the axis of rotation of the inner gimbal, a plunger slidably carried by the outer gimbal having a roller thereon adapted to ride on the peripheral surface of the last named cam, a second arm pivotally carried by the outer gimbal operatively connected to the plunger for moving the latter, an inclined plate carried by the second arm, a portion of the first arm being engageable with the plate, the construction and arrangement being such that when a torque is applied to the first arm its roller engages the peripheral surface of the first named cam and rotates the outer gimbal to a position wherein the roller may move into a depression in the first named cam and cage the outer gimbal to the frame, movement of the roller aforesaid into the depression effecting engagement of said portion of the first named arm with the inclined plate and rotating the second arm, whereby it moves the plunger, and the roller on the latter engages the double heart shaped cam, rotating the inner gimbal to a position wherein the plunger roller may move into one of two diametrically opposite depressions in the double heart shaped cam and cage the inner gimbal to the outer gimbal in one of two alternative positions 180° apart.

References Cited in the file of this patent

UNITED STATES PATENTS

| | | |
|---|---|---|
| 2,507,451 | Molnar et al. | May 9, 1950 |
| 2,645,129 | Brown | July 14, 1953 |
| 2,674,891 | Konet | Apr. 13, 1954 |

FOREIGN PATENTS

| | | |
|---|---|---|
| 135,487 | Sweden | Apr. 29, 1952 |